Figure 1:
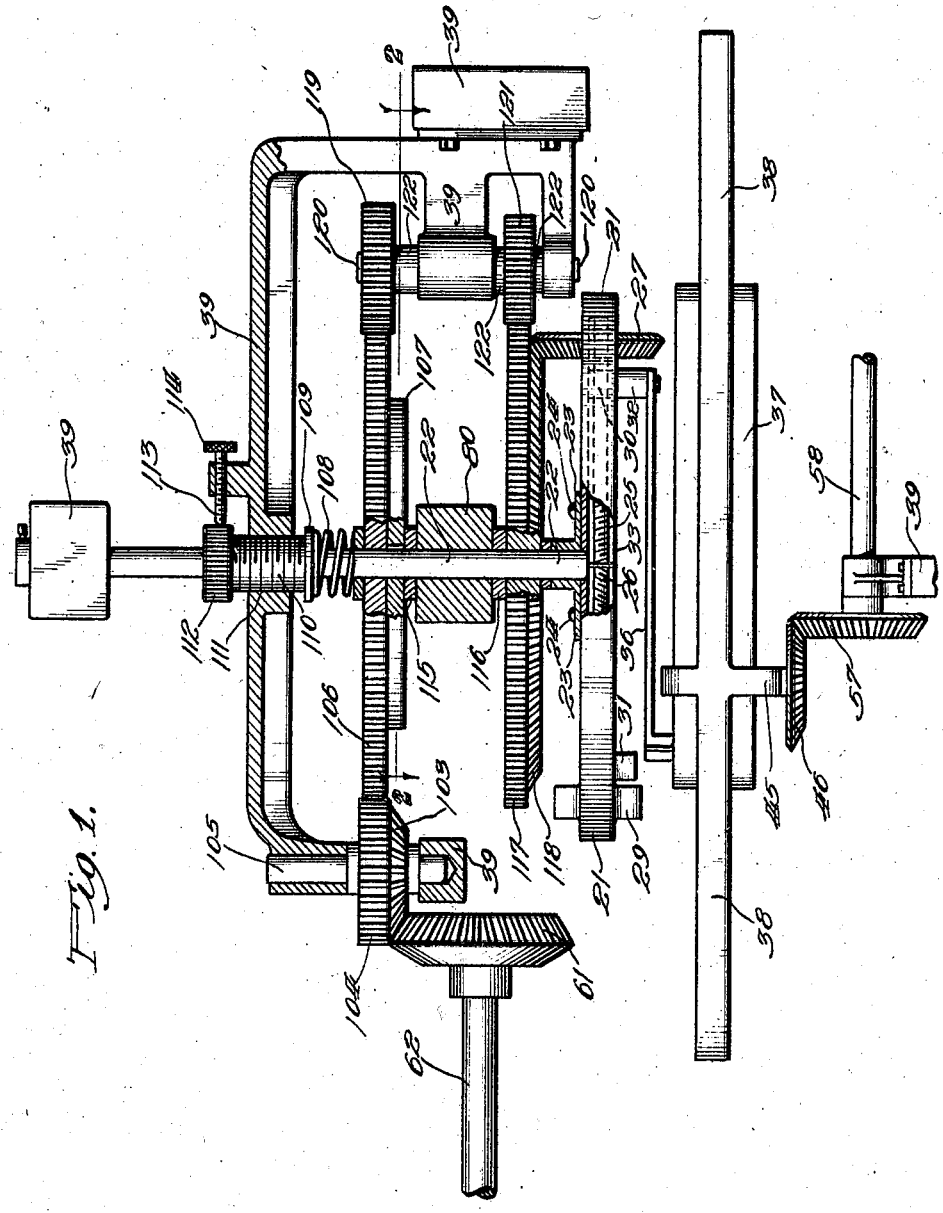

July 24, 1923.

C. H. GILL 1,462,810

AUTOMATIC CRANK TRANSMISSION MECHANISM

Original Filed Jan. 17, 1921    2 Sheets-Sheet 1

Witness:

Inventor:
Charles H Gill

July 24, 1923.
C. H. GILL
1,462,810
AUTOMATIC CRANK TRANSMISSION MECHANISM
Original Filed Jan. 17, 1921   2 Sheets-Sheet 2
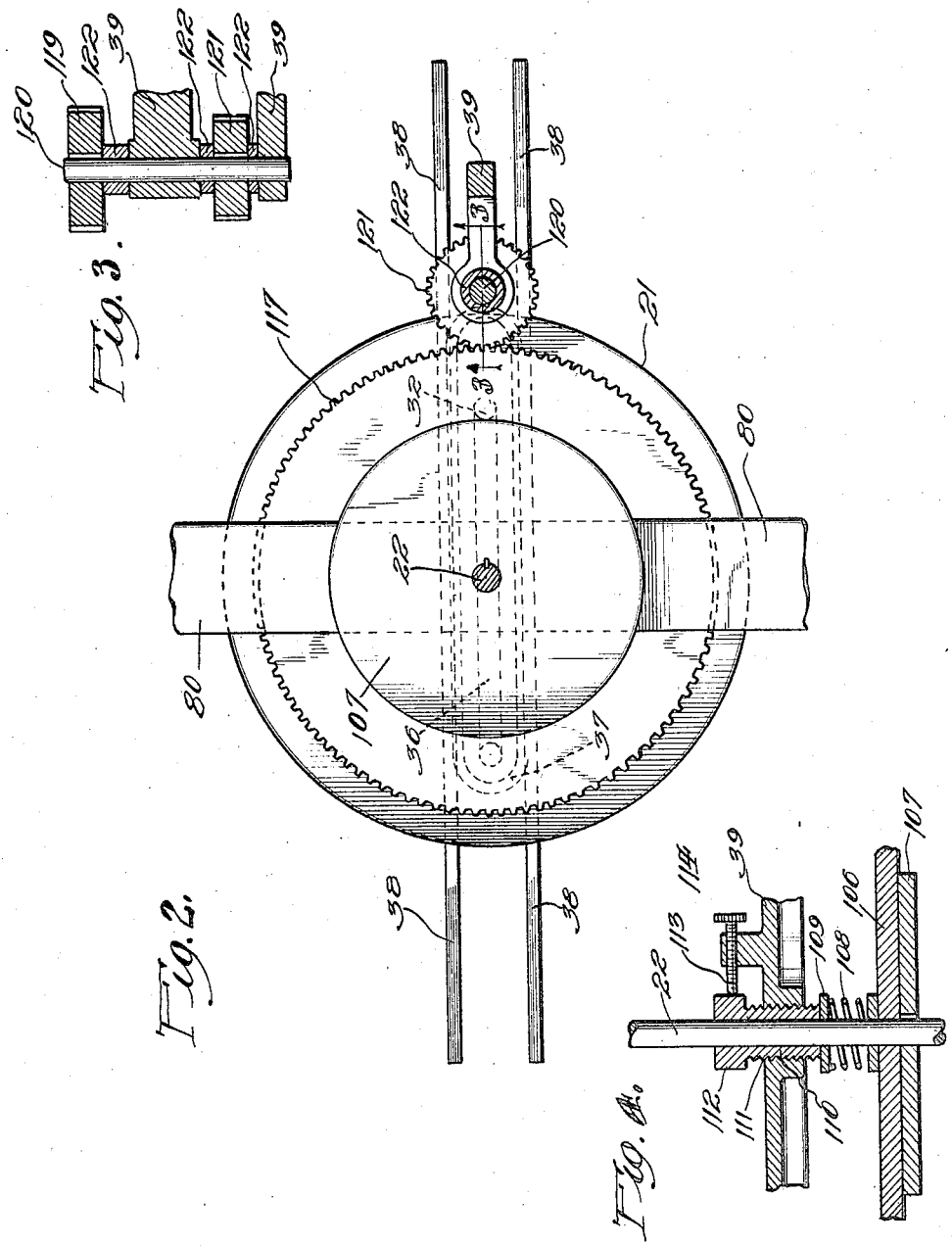
Witness:
Inventor
Charles H Gill Patented July 24, 1923.

1,462,810

UNITED STATES PATENT OFFICE.

CHARLES H. GILL, OF CHICAGO, ILLINOIS.

AUTOMATIC CRANK TRANSMISSION MECHANISM.

Original application filed January 17, 1921, Serial No. 437,801. Divided and this application filed April 4, 1921, Serial No. 458,638. Renewed August 10, 1922. Serial No. 585,074.

*To all whom it may concern:*

Be it known that I, CHARLES H. GILL, a citizen of the United States, residing at Chicago, in the county of Cook and State of Illinois, have invented a new and useful Automatic Crank Transmission Mechanism, of which the following is a specification.

Substantially the subject matter of my present application was originally incorporated in my application for Letters Patent for crank transmission mechanism, filed January 17th, 1921, Serial No. 437,801, and has been divided therefrom.

My invention relates to mechanism adapted to transmit motion from a driving member to a driven member and to vary the ratio of the speed of the driven member to the speed of the driving member inversely to changes in the degrees of resistance offered to the operation of the driven member, and to effect such changes in ratio through automatically acting means, requiring no attention of or action by the operator.

The principles involved in the present invention are, in a broad sense, identical with those disclosed in my applications for Letters Patent for friction transmission mechanism, filed April 17th, 1920, Serial No. 374,683; for transmission mechanism, filed December 29th, 1920, Serial No. 433,930; and for mechanical movement, filed December 29th, 1920, Serial No. 433,931. In the previously applied for patents, however, the automatically controlled mechanism for transmission of motion from a driving to a driven shaft was of the friction type of transmission; in the present embodiment the automatic ratio changing means is adapted and applied to operate in positively geared transmission mechanism of the type described in my application for Letters Patent for crank transmission mechanism, filed January 17th, 1921, Serial No. 437,801.

The objects of my invention are, first, to provide means controlled by the varying degrees of resistance that may be offered to the operation of a driven member for automatically changing the position of a wrist pin upon a crank relative to the axis of the said crank; and, second, to provide means for regulating the resistance controlled means in such manner that a given change in the distance of the wrist pin from the axis of the said crank may be effected by a greater or lesser change in the degree of resistance offered to the operation of the said driven member.

I attain these objects and others, as will hereinafter appear, by the mechanism illustrated in the accompanying drawings, in which—

Figure 1 is a side elevation and partly sectional view of a preferred construction of my invention; Figure 2 is a plan section taken on the line 2—2 of Figure 1; Figure 3 is a detail section taken on the line 3—3 of Figure 2; and Figure 4 is a section in side elevation of the adjusting mechanism for controlling pressure.

Similar numerals refer to similar parts throughout the several views.

21 designates a crank disk which is fixed to one end of a shaft 22 by means of a flared collar 23 and screws 24. A deep groove 25 is formed in the crank disk 21 and extends in a straight line across the axis of the crank disk and to near the periphery of that disk at its opposite sides. A shaft 26 is journaled at its opposite ends in the crank disk 21 and lies within and longitudinally of the groove 25. The shaft 26 is threaded in opposite directions upon either side of its center, which is just above the axis of the disk 21. A bevel gear wheel 27 is fixed upon the shaft 26 near one of the ends of that shaft and extends through the crank disk 21 in a slot 28. A balancing weight 29 equal in weight to the bevel gear wheel 27 is secured to the crank disk 21 at the side opposite to that occupied by the bevel gear wheel 27. That is, the weight of the balancing weight 29 is such that, in its fixed position, it balances the weight of the bevel gear wheel 27 that is in excess of the weight of the material taken out of the crank disk 21 in forming the slot 28.

A crank block 30 is adapted to slide longitudinally of and in the groove 25 and has an opening therethrough for the passage of the threaded shaft 26, which opening is internally threaded to engage with the threads of the shaft 26 upon one side of the center of the shaft 26. A counter-weight block 31 is also adapted to slide longitudinally of and in the groove 25 and is also provided with an internally threaded opening through which the shaft 26 passes and with which threads the threads of the shaft 26 engage. As the counter-weight block 31 is disposed in the groove 25 upon the opposite side of the center of the said groove 25 from the crank block 30, and at an equal distance from the axis of the crank disk 21, the part of the shaft 26 which engages the internal threads in the counter-weight block 31 is oppositely threaded to that portion of the shaft 26 which engages its threads with the internal threads of the crank block 30. Therefore, any rotation of the shaft 26 in either direction will cause the crank block 30 and the counter-weight block 31 to approach or recede from the axis of the crank disk 21 from opposite sides of such axis in like degrees and in unison with each other. The weight of the counter-weight block 31 is such as to equalize the weight of the crank block 30 and the portion of the weight of the connections of said crank block that is distributed through said crank block. It will thus be evident that the simultaneous movements of the crank block 30 and the counter-weight block 31 will always keep the crank disk 21 in perfect balance. The counter-weight block 31 and the crank block 30 are respectively so fashioned as to permit a crank pin 32, which is fixed upon the crank block 30, to be directly in line with the axis of the crank disk 21 when the crank block 30 and counter-weight block 31 abut each other, and so that the balance of the crank disk 21 will remain perfect when the said two blocks are thus positioned.

To retain the blocks 30 and 31 within the groove 25, strips 34 are secured to the face of the crank disk 21 by means of screws in such manner that the strips 34 project slightly over the edges of the groove 25 and form flanges along each side thereof. A collar 33 is fixed upon the shaft 26 at the point on said shaft in line with the axis of the crank disk 21.

A crank arm 36 is pivoted upon the crank pin 32 at one of its ends and pivoted upon a rack frame 37 at its opposite end. The rack frame 37 is adapted to slide back and forth in grooved tracks or slideways 38 which are secured to the frame 39 of the machine. The rack frame 37 is provided with rack teeth which are adapted to engage with gear wheels forming part of a mechanism adapted to reconvert the reciprocating motion of the rack frame 37 into rotary motion in a single direction, as described in my application for Letters Patent filed January 17th, 1921, Serial No. 437,801. As this forms no part of my present invention, and as it may be accomplished by any of a number of well known mechanical expedients, I do not illustrate or further describe this means for the reconversion of the reciprocating motion into continuous rotary motion.

A drive shaft 62 is provided with a bevel gear wheel 61 fixed thereon and this engages with a bevel gear wheel 103 having a gear wheel 104 secured thereto, both of the gear wheels 103 and 104 being fixed upon a shaft 105 journaled in the machine frame 39. The gear wheel 104 engages with a gear wheel 106 which is mounted for free rotation upon a shaft 22 which is journaled in a portion 80 of the machine frame 39. A disk 107 is fixed to the shaft 22 for rotation therewith and the flat under surface of the gear wheel 106 rests upon the flat upper surface of the disk 107 and is pressed against that disk by a spiral spring 108 which surrounds the shaft 22 and the opposite end of which spring 108 is pressed against a collar 109 on an externally threaded sleeve 110 which surrounds the shaft 22 loosely. The threaded sleeve 110 passes through an internally threaded opening 111 in the machine frame 39 and is supplied with a milled head 112 for adjusting the tension of the spring 108 by compressing that spring more or less between the collar 109 and the gear wheel 106, thus adjusting the degree of the pressure of the gear wheel 106 against the disk 107. A set screw 113 is threaded through the machine frame 39 and has a milled head 114 for screwing the set screw 113 against the milled head 112 of the sleeve 110 to retain that sleeve in adjusted position. A loose washer 115 surrounds the shaft 22 and separates the disk 107 from the bearing 80.

A collar 116 fixed to the shaft 22 is interposed between the bearing 80 and a gear wheel 117 which is mounted upon the shaft 22 for free rotation thereon. A bevel gear wheel 118 is secured to the gear wheel 117 for rotation therewith and for free rotation upon the shaft 22. The bevel gear wheel 118 meshes with the bevel gear wheel 27.

The gear wheel 106 contains a few less teeth than the gear wheel 117. The gear wheel 106 engages with a gear wheel 119 fixed to a shaft 120 journaled in the machine frame 39. Another gear wheel 121, having a few less teeth than the gear wheel 119, is also fixed upon the shaft 120 and engages the gear wheel 117. Washers 122 maintain the shaft 120 in position.

The rotary motion of the shaft 62 is transmitted through the bevel gear wheels 61 and 103 and the gear wheel 104 to the gear wheel 106. This transmits it, through its frictional engagement with the disk 107, to the shaft 22 and to the crank disk 21 which is secured to the shaft 22. At the same time, the gear wheel 106 transmits rotary motion to the gear wheel 119 and, through the shaft 120 and the gear wheel 121, to the gear wheel 117 and its attached bevel gear wheel 118. As the bevel gear wheel 118 is rotated more slowly than the gear wheel 106 and the shaft 22, it will normally rotate the bevel gear wheel 27 in a direction opposite to the direction of rotation of the crank disk 21 and this will cause the crank block 30 to be gradually screwed out toward the outer edge of the crank disk 21, increasing the ratio of the speed of the driven shaft over that of the driving shaft. When, however, a speed is attained which is as high as can be driven with the load and with the adjustment of the spring 108, the gear wheel 106 will begin to slip somewhat in its frictional engagement with the disk 107 and will, therefore, rotate somewhat faster than the shaft 22. When this increase of the rotary speed of the gear wheel 106 over the rotary speed of the shaft 22 becomes sufficient to equalize the normal difference in the rotary speeds of the shaft 22 and the bevel gear wheel 118, the crank block 30 will remain in whatever position it was in when this equalization was attained. Should the gear wheel 106 slip still further in its frictional engagement with the disk 107, the bevel gear wheel 118 will be caused to rotate faster than the shaft 22 and will rotate the threaded shaft 26 in the direction to cause the crank block 30 to move toward the axis of the crank disk 21.

Thus, the crank block 30 will always travel toward the outer edge of the crank disk 21 until it reaches a point where the pressure of the spring 108 is not sufficient to maintain the frictional engagement of the gear wheel 106 and the disk 107 without enough slippage of the gear wheel 106 to equalize the rotary speeds of the shaft 22 and the bevel gear wheel 118. Whenever additional resistance to the rotation of the driven shaft 58 is offered, whether by adding to the load carried by the vehicle or to an increase of grade or road inequalities, the gear wheel 106 will slip more and the crank block 30 will automatically recede toward the axis of the crank disk 21, reducing the ratio of the rotary speed of the driven shaft to the speed of the driving shaft. When the resistance offered to the rotation of the driven shaft is reduced in degree, the reverse action takes place and the crank block 30 moves toward the periphery of the crank disk 21 and increases the ratio of the rotary speed of the driven shaft to the rotary speed of the driving shaft.

The tension of the spring 108 can be adjusted to maintain the frictional engagement of the gear wheel 106 and the disk 107 without slippage under any load which, at a given gear ratio, will not tend to stall the engine. When this is done properly, my automatic means will insure the most economical driving at all times, since the greatest travel speed possible at the speed of the engine will always be maintained and the engine will always be running at the very slowest speed at which it can produce the power to propel the vehicle at the desired travel speed.

It will be evident that numerous departures from the specific construction described herein might be possible without departing from the spirit of my invention. I do not, therefore, wish to be limited to the specific construction shown and described, but to be limited only by the prior state of the art and by the following claims.

I claim:

1. In automatic crank transmission mechanism, the combination of a driving shaft, a driven shaft, a rotatable member carried by said driven shaft, a friction element secured upon said driven shaft, a radially movable wrist pin carried by said rotatable member, a friction member rotatable by said driving shaft and frictionally engaging the said friction element, and means controlled by the slippage of the said friction member and the said friction element in their engagement with each other for automatically varying the position of the said wrist pin with respect to the axis of the said rotatable member.

2. In automatic crank transmission mechanism, the combination of a driving shaft, a rotatable member, a radially adjustable wrist pin upon the said rotatable member, a friction element rotatable with the said rotatable member, a friction member rotatable by the said driving shaft, means for pressing the said friction element and the said friction member into frictional engagement, and means controlled by the varying degrees of slippage between the said friction member and said friction element under varying degrees of resistance offered to the rotation of the said rotatable member for varying the distance of the said wrist pin from the axis of the said rotatable member inversely to variations in the degree of resistance offered to the rotation of the said rotatable member.

3. In automatic crank transmission mechanism, the combination of a driving shaft, a rotatable member, a wrist pin movable radially of and upon the said rotatable member, a friction member adapted to frictionally drive the said rotatable member and positively driven by the said driving shaft, and automatic means controlled by the degree of slippage of the said friction member for varying the distance of the said wrist pin from the axis of the said rotatable member inversely to variations in the degree of resistance offered to the rotation of the said rotatable member.

4. In automatic crank transmission mechanism, the combination of a driving shaft, a rotatable member, a radially adjustable wrist pin upon the said rotatable member, a friction element rotatable with the said rotatable member, a friction member rotatable by the said driving shaft, means for pressing the said friction element and the said friction member into frictional engagement, means for adjusting the last named means, and means controlled by the varying degrees of slippage between the said friction member and the said friction element under varying degrees of resistance offered to the rotation of the said rotatable member for varying the distance of the said wrist pin from the axis of the said rotatable member inversely to variations in the degree of resistance offered to the rotation of the said rotatable member.

5. In automatic crank transmission mechanism, the combination of a driving friction member, a rotatable member adapted to be frictionally driven by said driving friction member, a wrist pin movable radially of and upon the said rotatable member, and means controlled by the degree of slippage of the said driving friction member for automatically varying the distance of the said wrist pin from the axis of the said rotatable member inversely to variations in the degree of resistance offered to the rotation of the said rotatable member.

6. In automatic crank transmission mechanism, the combination of a driving friction member, a rotatable member adapted to be frictionally driven by the said driving friction member, a wrist pin movable radially of and upon the said rotatable member, and means controlled by the slippage of the said driving friction member above a given degree for automatically moving the said wrist pin toward the axis of the said rotatable member and controlled by the slippage of the said driving friction member below the said given degree for moving the said wrist pin automatically away from the axis of the said rotatable member.

7. In automatic crank transmission mechanism, the combination of a driving shaft, a driven shaft, a positively driven member having a flat surface, a member pressed into engagement with said positively driven member through resilient means, an adjustable crank, and means controlled by the slippage or non-slippage of the member frictionally engaging the said positively driven member for varying the ratio of the rotary speed of the said driven shaft to the rotary speed of the said driving shaft inversely to variations in the resistance offered to the rotation of the said driven shaft.

8. In automatic crank transmission mechanism, the combination of a driving shaft, a driven shaft, means including an adjustable crank for transmitting rotary motion from the said driving shaft to the said driven shaft, and a friction member adapted to automatically control the ratio of the rotary speed of the said driven shaft to the rotary speed of the said driving shaft according to the degree of slippage of the said friction member.

9. In automatic transmission mechanism, the combination of a driving rotatable member, a driven rotatable member adapted to be pressed with its flat side against the flat side of the said driving rotatable member, resilient means for so pressing the said members into such frictional engagement, and automatically operating means controlled by the degree of effectiveness of the frictional engagement of the said members for varying the ratio of the rotary speed of a driven shaft to the rotary speed of the said driving rotatable member in inverse proportion to variations in the resistance offered to the rotation of the said driven shaft.

10. In automatic crank transmission mechanism, the combination of a driving friction member, a rotatable member adapted to be frictionally driven by the said driving friction member, a threaded shaft journaled in the said rotatable member, a wrist pin movable radially of the said rotatable member and in screw engagement with the said threaded shaft, and means for rotating the said threaded shaft at speeds and in directions varying with the degree of slippage of the said driving friction member under varying degrees of resistance offered to the rotation of the said rotatable member and thus varying the position of the said wrist pin with respect to the axis of the said rotatable member.

11. In automatic crank transmission mechanism, the combination of speed ratio changing mechanism including a crank having a wrist-pin adjustable thereon with respect to its distance from the axis of said crank, a driving shaft, a driven shaft adapted to be driven by the said driving shaft through the said speed ratio changing mechanism at varying ratios of speed to the speed of the said driving shaft, two frictionally engaging elements, and means controlled by the degree of slippage of the said elements in their engagement under varying degrees of resistance offered to the rotation of the said driven shaft for automatically so adjusting the said wrist-pin with respect to its distance from the axis of said crank at each variation in the degree of resistance offered to the rotation of the said driven shaft as to vary the ratio of the rotary speed of the said driven shaft to the speed of the said driving shaft inversely proportionately to variations in the degree of resistance offered to the rotation of the said driven shaft.

12. In automatic crank transmission mechanism, the combination of a crank, a wrist-pin carried by said crank and adjustable thereon with respect to the axis of said crank, two frictionally engaging elements, and automatic means controlled by the degree of slippage of the said two elements in their engagement under varying degrees of resistance offered to the rotation of the said crank for adjusting the said wrist-pin with respect to its distance from the axis of said crank inversely proportionately to variations in the degree of resistance offered to the rotation of the said crank.

13. In automatic crank transmission mechanism, the combination of a driving shaft, a driven shaft, means including an adjustable crank and two frictionally engaging elements for transmitting rotary motion from the said driving shaft to the said driven shaft, and automatic means controlled by the degree of slippage in the frictional engagement of the said elements for so adjusting the said adjustable crank as to vary the ratio of the rotary speed of the said driven shaft to the rotary speed of the said driving shaft inversely to variations in the degree of resistance offered to the rotation of the said driven shaft.

14. In automatic crank transmission mechanism, the combination of a driving shaft, a driven shaft, two frictionally engaging elements interposed between the said shafts, speed ratio changing mechanism interposed between the said frictionally engaging elements and the said driven shaft and including an adjustable crank, and automatic means controlled by the degree of slippage in the frictional engagement of the said two elements for so adjusting the said adjustable crank as to vary the ratio of the rotary speed of the said driven shaft to the rotary speed of the said driving shaft inversely to variations in the degree of resistance offered to the rotation of the said driven shaft.

CHARLES H. GILL.